United States Patent
Beels Van Heemstede

[11] Patent Number: 6,161,512
[45] Date of Patent: Dec. 19, 2000

[54] SPROCKET SYSTEM WITH INTERNAL TORSIONAL DAMPER

[75] Inventor: Hans R. Beels Van Heemstede, Heidelberg, Germany

[73] Assignee: Morse TEC Europe S.P.A., Italy

[21] Appl. No.: 09/154,686

[22] Filed: Sep. 17, 1998

[51] Int. Cl.[7] .................................................. F01L 1/02
[52] U.S. Cl. ................................. 123/90.31; 123/192.1; 74/574; 474/94
[58] Field of Search .................... 123/90.31, 192.1; 74/604, 595, 574, 572; 474/94, 161, 164, 165, 902

[56] References Cited

U.S. PATENT DOCUMENTS

| | | | |
|---|---|---|---|
| 306,267 | 10/1884 | Turno | 474/94 |
| 447,447 | 3/1891 | Daily | 474/94 |
| 608,770 | 8/1898 | Godfray | 474/94 |
| 1,254,542 | 1/1918 | Schwinn | 474/94 |
| 1,518,360 | 12/1924 | Royce | 74/574 |
| 4,139,995 | 2/1979 | Lamarche | 64/27 |
| 4,254,985 | 3/1981 | Kirschner | 295/7 |
| 4,317,388 | 3/1982 | Wojcikowski | 74/574 |
| 5,308,289 | 5/1994 | Funahashi | 474/94 |
| 5,560,267 | 10/1996 | Todd et al. | 74/604 |
| 5,579,665 | 12/1996 | Mott et al. | 74/574 |
| 5,619,887 | 4/1997 | Simpson | 74/574 |
| 5,655,416 | 8/1997 | Mott et al. | 74/574 |

FOREIGN PATENT DOCUMENTS

| | | | |
|---|---|---|---|
| 0 198 726 | 10/1986 | European Pat. Off. | |
| 5-113110 | 5/1993 | Japan | 123/90.31 |

*Primary Examiner*—Noah P. Kamen
*Attorney, Agent, or Firm*—Sidley & Austin; Greg Dziegielewski

[57] ABSTRACT

The present invention relates to a sprocket system having an internal torsional damper which absorbs crankshaft torsional vibrations and minimizes their transfer to other components in the engine system. In particular, the present system interposes uses friction plates in the various embodiments to absorb the dissipated torsional and vibrational energy.

13 Claims, 4 Drawing Sheets

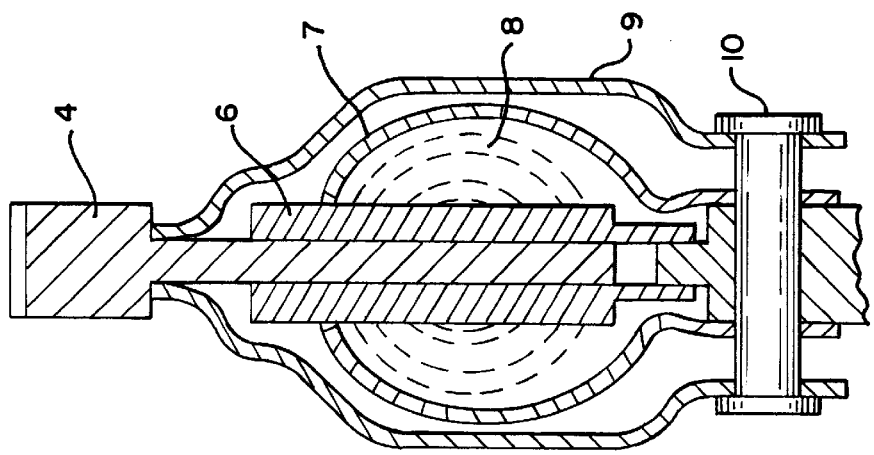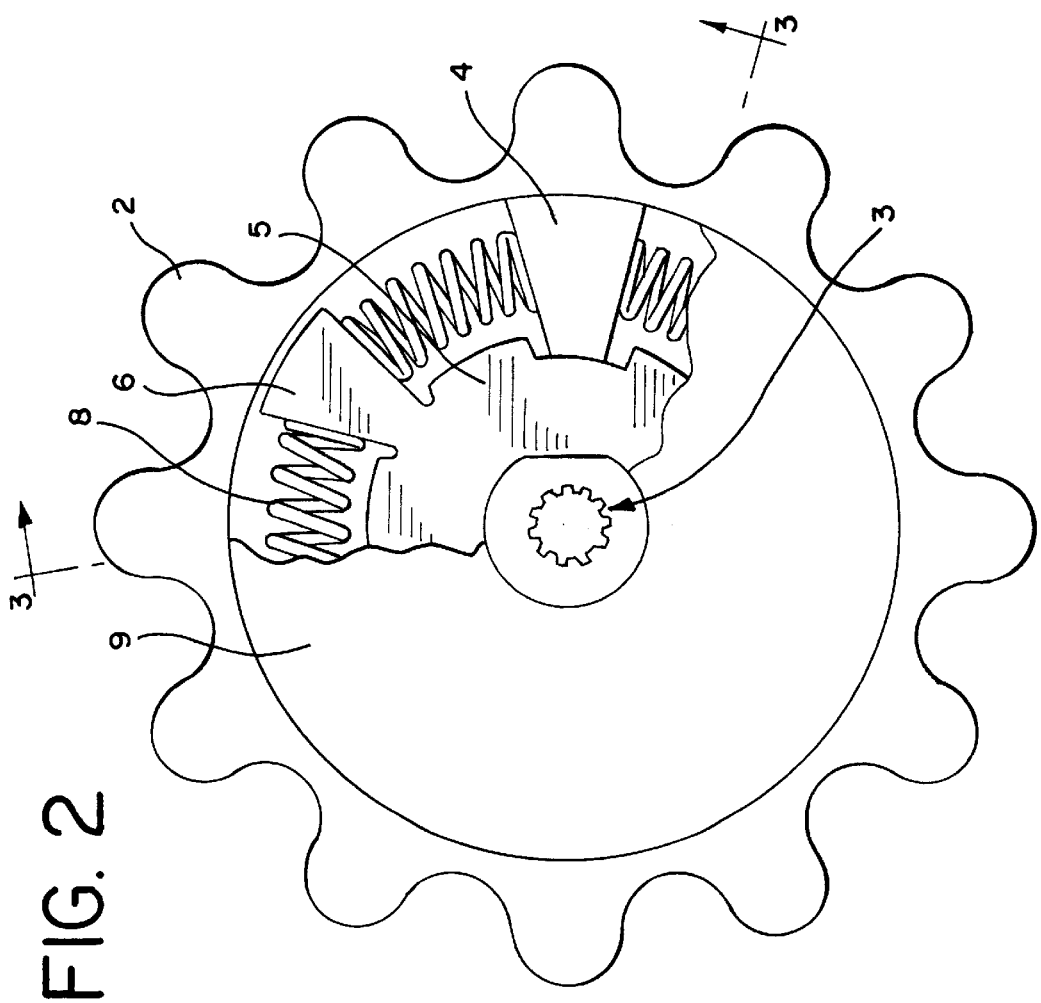

SPROCKET SYSTEM WITH INTERNAL TORSIONAL DAMPER

FIELD OF INVENTION

This invention relates to the damping of vibrations in engine timing and balance shaft drives. This invention has particular application to engine timing systems with sprocket on a rotating shaft. More particularly, this invention relates to a sprocket system with an internal torsional damper in an engine timing drive and balance shaft drive to absorb torsional loads and vibrations from a rotating shaft.

BACKGROUND OF THE INVENTION

Engine timing and balance shaft drive systems typically include an endless chain driven by a driving sprocket on an engine crankshaft and driving a driven sprocket on an engine camshaft and balance shaft drive. The rotation of the crankshaft causes the rotation of the camshaft and balance shaft through the endless chain system.

More complicated engine timing systems connect the crankshaft with two or more shafts by a pair of chains. The crankshaft includes two sprockets. Each chain is connected to one or more driven sprockets, including sprockets on each of the two overhead camshafts and balance shafts. Typically, the chain systems in more complicated engine timing systems will include tensioners on the slack side of each chain to maintain chain tension and snubbers on the tight side of each chain to control chain movement during operation.

Some engine timing systems have two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control.

In some engine timing systems, such as those having a non-conventional firing order for the cylinders, balance shafts are employed to balance the load across the engine. The balance shafts, which are driven by a chain connection from the crankshafts, may be utilized to operate an auxiliary drive such as an oil pump and or a compressor. Since the balance shafts are driven by the crankshaft, torsional vibrations and oscillations along the crankshaft may be transferred to the balance shafts and throughout the timing system.

The rotating crankshaft may undergo resonance at certain frequencies. Since the balance shafts are coupled to the crankshaft by the balance shaft chain, the balance shafts are directly exposed to these extreme resonant torsional vibrations. Vibrations from the resonance of the crankshaft are often transferred throughout the system, including the balance shafts and can significantly increase the load on the systems and components, increase the noise from the engine and increase wear and fatigue loading of the timing chains.

Conventional approaches to this problem have focused on reducing rotational perturbation of the crankshaft, by means of internal devices such as counter-rotating balance shafts, Lanchaster dampers and harmonic balancers. External devices such as fluid engine mounts and engine mounts having adjustable damping characteristics have been used. By contrast, the present invention focuses on absorbing the torsional vibrations of a rotating shaft using a sprocket system with an internal torsional damper. The sprocket system minimizes the transfer of such vibrations and torque spikes to other parts of the engine system. The sprocket system utilizes a unique combination of friction plates and/or springs to absorb the vibrations and prevent the transfer of the shaft vibrations to other areas of the engine system. This sprocket system with internal damper could be used on any sprocket shaft connection in an engine. Preferably, the system is used on a crankshaft with a sprocket.

Some prior art timing systems use various damping devices to address the problem of vibrations. One example of such prior art system uses a rubber damper piece which is placed against a sprocket and bolted to the shaft to absorb vibrations. However, the rubber damper piece may fracture from the extreme resonance vibrations. Other timing systems employ a weight that is positioned on the shaft and held against the sprocket by a Belleville washer. Frictional material is also placed at the area of contact between the sprocket and the weight. These systems, while effective at damping have drawbacks in terms of production, assembly and durability.

An example of the above-described prior damping techniques is found in Wojcikowski, U.S. Pat. No. 4,317,388, which issued on Mar. 2, 1982. That patent discloses a gear with split damping rings of diameter slightly smaller than the gear bolted to each side of the gear with a tapered bolt and nut assembly. Tightening of the bolt cams the damping ring outward, producing pressure circumferentially against the rim of the gear and causing tensile stress on the gear. Additionally, tightening of the bolts presses the elastomeric washers associated with the bolt and nut assembly firmly against the web of the gear which damps the stress wave passing from the rim through the web and into the shaft. In contrast to this prior art structure, the present invention utilizes a novel system to produce a sprocket system with an internal torsional damper to reduce the transfer of vibrations of rotating shaft to other parts of the engine system.

Another example of the above-described prior art is Funashashi, U.S. Pat. No. 5,308,289, which issued on May 3, 1994. The damper pulley disclosed therein consists of a pulley joined to a damper mass member with a resilient rubber member. The pulley and the damper-mass member each have at least two projections, and the projections of the pulley contact the sides of the projections of the damper mass member. A second resilient rubber member is placed between the contacting projections. Bending vibrations from the crankshaft cause the pulley to vibrate in the radial direction and the first resilient rubber member deforms, causing the dynamic damper to resonate with the pulley and restrain the bending vibrations. Torsional vibrations cause the pulley to vibrate in the circumferential direction. The second resilient rubber member undergoes compression deformation, decreasing the spring force and raising the resonance frequency against the torsional vibrations. The present invention avoids the use of rubber which has wear problems in use. Instead, the present invention utilizes friction plates made of frictional material having a stable coefficient of friction to dissipate the vibrations.

Another example of a prior damping technique is found in Kirschner, U.S. Pat. No. 4,254,985, which issued on Mar. 10, 1981. That patent discloses a damping ring for rotating wheels that includes a viscoelastic damping material disposed within an annular groove in the surface of the wheel. A metal ring is positioned in the groove at the top of the damping material. In operation, the damping material undergoes shear deformation.

Still yet another example of prior art damping techniques is found in U.S. Pat. No. 4,139,995 which discloses a high deflection amplitude torsional vibration damper for use in a torsional coupling between a driving member and a driven member. The damper includes a hub receiving a driven shaft and having oppositely disposed arms. The damper has a pair of equalizers with oppositely extending arms journalled on the hub. A pair of cover plates encloses the assembly and has integral driving means formed therein. A plurality of compression springs are found within the plates, positioned between the hub and equalizer arms.

SUMMARY OF THE INVENTION

In an engine timing and balance shaft drive system, an endless chain connects a driving sprocket on the crankshaft to a driven sprocket on a camshaft. The rotation of the driving sprocket advances the chain, which turns the driven sprocket and the camshaft. Torsional vibrations occur during system operations and may be exceptionally severe at resonance conditions. Torsional vibrations can also arise from any other rotating shafts in the engine system. The embodiments of this invention can be used in any sprocket rotating shaft combination. To reduce these torsional vibrations and to reduce the transfer of these vibrations to other portions of the engine, the present invention provides a sprocket system with an internal torsional damper.

In the first embodiment, the sprocket system comprises a sprocket with three circumferentially spaced rotational stops, a hub with three circumferentially spaced hub locators and a annular housing, located along a rotating shaft. Springs are compressed between the adjacent hub locators and rotational stops. In this first embodiment, in addition to the springs, friction plates provide damping action as the sprocket slightly rotates relative to a hub locator. Furthermore, this embodiment may include more than one friction plate as well as steel retainer plates surrounding the structure and attached to the hub.

In a second embodiment, the sprocket system with internal torsional damper comprises three sprockets positioned on a rotating shaft. In this second embodiment, the inner hub sprocket which is formed integrally with the hub is positioned between the two outer sprockets on the shaft. The torsional vibrations from the rotating shaft are damped by an arrangement of a coil spring and friction plates positioned between the outer two sprockets and an inner hub sprocket. The outer two sprockets are held in place on the shaft by Belleville washers and clips positioned upon the central sprocket hub.

In a third embodiment, friction plates are placed between an inner hub sprocket and two outer sprockets. The inner hub sprocket is positioned between the outer sprockets. The friction plates alternate between being splined and not splined to the shaft. The friction plates that are not splined can rotate freely about the shaft. Belleville washers along with clips are used to hold the two outer sprockets and friction plates to the rotating shaft and in close proximity to the inner hub sprocket. In yet a further modification of this embodiment, a large locking nut attached to the hub. The locking nut can be tightened or loosened to adjust the distance between the sprockets.

In a fourth embodiment, there are two hub sprockets surrounded on each side by sprockets. Friction plates are placed between each adjacent hub sprocket and sprocket. Belleville washers along with clips are used to hold the two outermost sprockets to the central hub member. The sprockets and/or hub sprockets can be splined or keyed to the hub.

BRIEF DESCRIPTION OF THE DRAWINGS

For a more complete understanding of the invention, one should refer to the embodiments illustrated in greater detail in the drawings and described below by way of examples of the invention. In the drawings, which are not to scale:

FIG. 2 is a plan view of the first embodiment of the sprocket system with the internal torsional damper with a cut away to reveal the interior of the sprocket as illustrated in side view in FIG. 3.

FIG. 3 is a cross sectional view of the first embodiment of the sprocket with the internal torsional damper of the present invention taken along irregular line 3—3 of FIG. 2.

DETAILED DESCRIPTION

Figure 1:
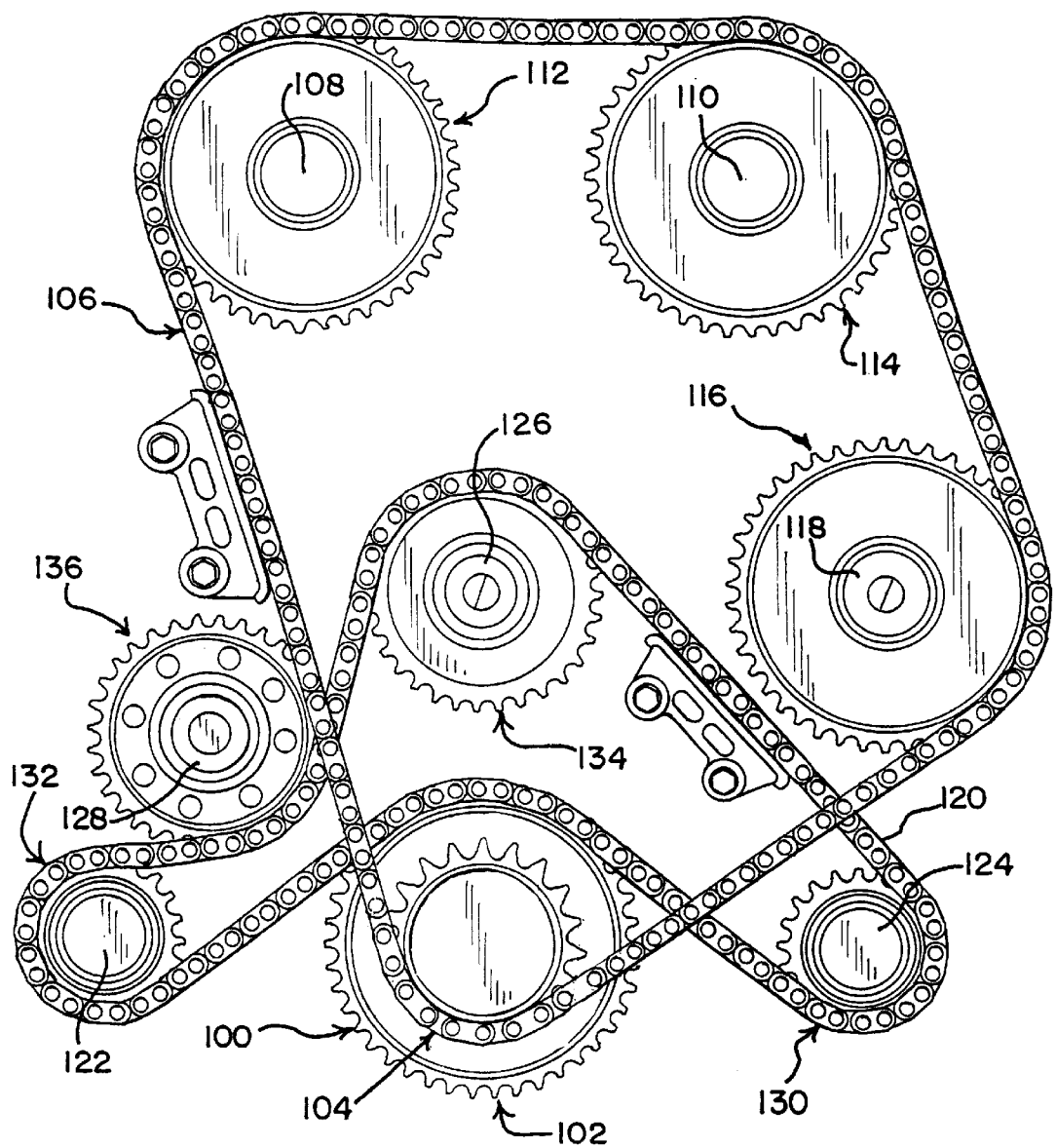
FIG. 1 is schematic view of an engine system which may incorporate the sprocket system having an internal damper of the present invention.

The sprocket system with internal torsional damper of the present invention can be utilized in a multiple axis timing chain system, which is schematically illustrated in FIG. 1. The sprockets can be either single units or sprocket pairs, with the pairs having aligned teeth or having their teeth phased, or offset, by a portion of one tooth. Phased sprockets and chain assemblies are described in U.S. Pat. No. 5,427,580, which is incorporated herein by reference in its entirety.

Crankshaft 100 provides power output through sprocket 102, and crankshaft drive sprocket 104. Crankshaft drive sprocket 104, carries load or transmits power to chain 106. The chain 106 provides the primary drive of the two overhead camshafts 108 and 110. Camshaft 108 includes a camshaft sprocket 112 and camshaft 110 also includes a camshaft sprocket 114. The chain 106 also drives idler sprocket 116.

The sprocket 102 is a balance shaft drive sprocket that provides power transmission through chain 120 to a pair of balance shafts 122, 124, an idler shaft 126 and to an accessory drive 128, such as an oil pump drive. Chain 120 therefore transmits power from the balance shaft drive sprocket 102 to a first balance shaft driven sprocket 130 and to a second balance shaft driven sprocket 132. The chain also drives idler sprocket 134 on idler shaft 126 and accessory drive sprocket 136 on accessory drive 128. The balance shaft chain drive system can include a pair of chains in place of single chain 120, and a pair of sprockets in place of single sprocket 102. In such a system, one chain of the pair of chains would preferably drive the idler sprocket while the other chain of the pair of chains would drive the accessory drive.

The chain assemblies of the multi-axis chain drive system shown in FIG. 1 utilize conventional snubbers and tensioning devices to maintain tension and lateral control in various portions of the chain drive. Such devices are known to those skilled in the chain art.

FIGS. 2 through 8 illustrate various embodiments of the sprocket system with an internal torsional damper of the present invention, in which crankshaft shaft drive sprocket 2, corresponds to sprocket 104 illustrated in FIG. 1. Although described in conjunction with a crankshaft having torsional vibrations, the sprocket system of the instant invention can be used on any rotating shaft which has torsional vibrations or receives torsional vibrations.

A crankshaft drive sprocket 2 as used in the first embodiment of the sprocket system with an internal torsional damper of the instant invention is shown in FIGS. 2 and 3. The crankshaft drive sprocket may be any conventional involute tooth sprocket. The crankshaft drive sprocket 2 is mounted on a crankshaft 3. The crankshaft drive sprocket is securely fastened to the crankshaft by splines. A chain (not shown) travels around the teeth of the crankshaft drive sprocket to drivingly connect the crankshaft to the camshaft. The size of the sprocket and the dimensions are dependent upon the system configuration and the power requirements.

The crankshaft drive sprocket is in the form of an annular ring having a central opening to receive the end of the rotating crankshaft and a sprocket rim with teeth. An inclined area is found in between the sprocket rim and the centrally splined opening. Three rotational stops 4 in the form of projecting trapezoidal fingers extend from the sprocket rim inwardly toward the centrally splined opening. The three rotational stops are disposed 120 degrees apart from each other.

A hub member 5 is adapted to fit adjacent the crankshaft drive sprocket 2 on the shaft 3 in this first embodiment. The hub member has a centrally located splined opening to receive the splined end of the rotating crankshaft. The hub member has three hub locators 6 extending outwardly from the edge of the hub. The hub locators are essentially triangular shaped projections extending outwardly from the outer periphery of the hub member. The apex of the triangular projection is at the perimeter of the hub member. A small indentation is made into the hub member on each side of the apex of the triangular projection. The hub locators are also spaced equally around the periphery of the hub member, but displaced from the rotational stops of the sprocket.

Friction plates 7 are attached to the hub. Preferably, at least two friction plates are used, although more can be used depending upon the amount of energy desired to be absorbed by the friction plates. The friction plates may be any plates made of any conventional material used to dissipate friction and absorb energy. Preferably, the friction plates are made of materials used in clutch fitting and the like where energy is dissipated. Springs 8 are attached between each set of hub locators and adjacent rotational stop. The springs rest in the inclined portion of the sprocket between the hub locator and the rotational stop. The location of the spring in FIG. 3 is shown in phantom. Preferably, the total tension of the springs should be approximately in the range of the expected torsional loading expected from the system.

In yet a further modification of this embodiment, an annular housing 9 having a central opening covers the hub member, springs, friction plates and a portion of the crankshaft drive sprocket. The housing is preferably made of steel stamping and is secured to the hub by any suitable means such as rivets 10.

In this first embodiment, as the hub member and the sprocket rotate relative to each other, the friction plates and springs absorb any torsional vibrations from the crankshaft and prevent the transfer of such rotations throughout the system.

Figure 5:
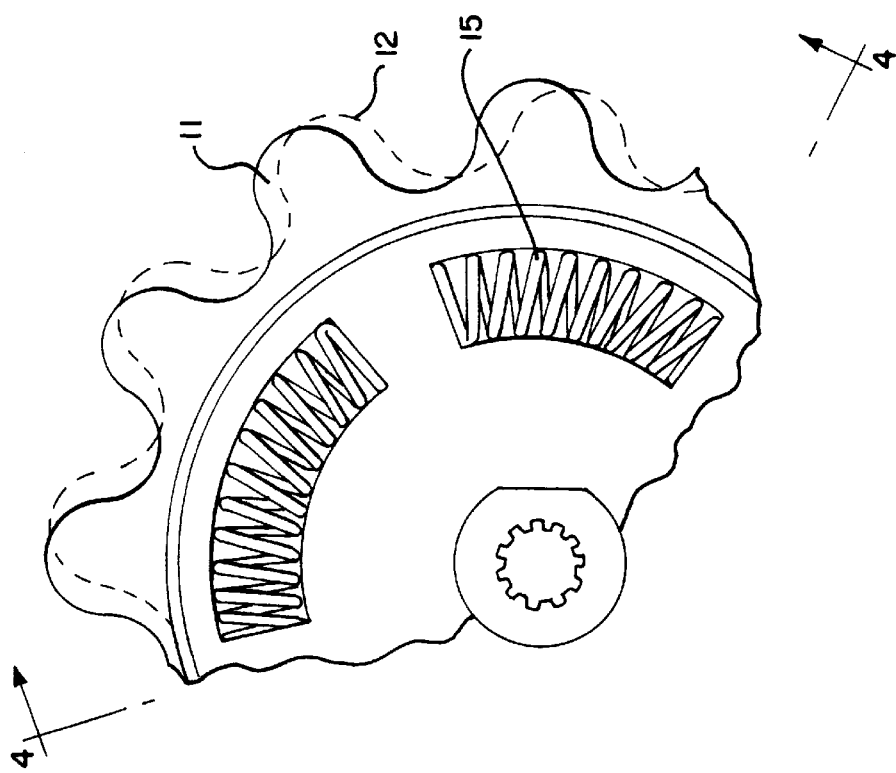
FIG. 5 is a plan view of the sprocket system illustrated in FIG. 4 with a cutaway to reveal the interior of the sprocket illustrated in side sectional view in FIG. 4.
Figure 4:
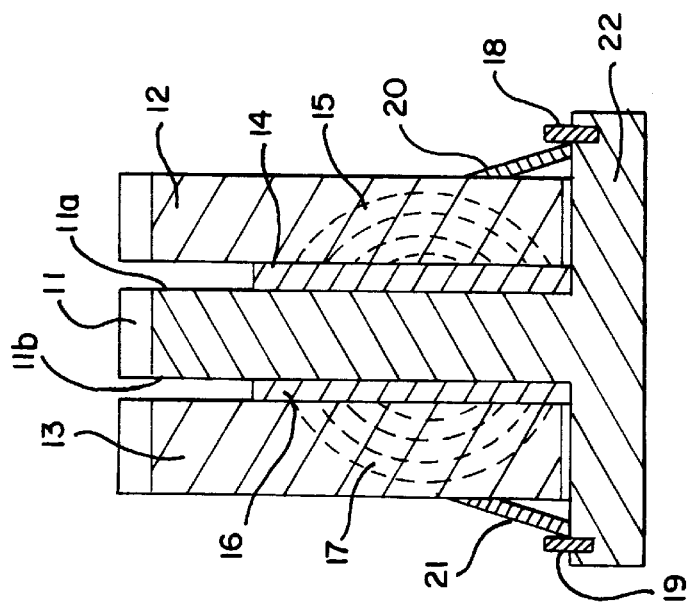
FIG. 4 is a side sectional view of the second embodiment of a sprocket system with an internal torsional damper of the present invention taken along irregular line 4—4 of FIG. 5.

In a second embodiment of the present invention, the sprocket system with internal torsional damper comprises three sprockets: an inner hub sprocket and two outer sprockets on a rotating shaft or hub 22. This second embodiment is illustrated in FIG. 4 and FIG. 5. Preferably, the outer sprockets are narrower in width than the inner hub sprocket. Each of the three sprockets may be conventional involute tooth sprockets. Preferably, the tooth profile of the outer sprockets differs from the tooth profile of the inner hub sprocket and is not as deep as the hub sprocket tooth profile. The size and dimensions of the sprockets are dependent upon the engine and the configuration of the system. The outer sprockets are free to move against the force of the spring until the tooth profiles line up.

A hub sprocket 11 having a first side 11a and a second side 11b extends outwardly from the hub 22. The hub sprocket is integral with the hub. A first outer sprocket 12 is positioned on said hub with its inner face adjacent to the first side 11a of the hub sprocket. Similarly, a second outer sprocket 13 is positioned on the hub with its inner face adjacent to the second side 11b of the hub sprocket. The inner faces of the first and second outer sprockets adjacent the hub sprocket are concave.

A friction plate 14 is positioned between the inner face of the first outer sprocket and the first side of the hub sprocket. The friction plate may be formed from any conventional materials used in clutch facing or like products wherein energy is dissipated provided that the materials have a stable coefficient of friction and good surface wear characteristics. A spring 15 rests against the surface of the outer sprockets and pushes against the hub to purposely misalign the sprocket teeth. Similarly, a friction plate 16 is positioned between the inner face of the second outer sprocket and the second side of the hub sprocket. The spring element acting between the inner sprocket 11 and outer sprockets 12, 13 may be a pair of springs. A first spring 15 acts between the inner sprocket 11 and the first outer sprocket 12 and the second spring 17 acts between the inner sprocket and the second outer sprocket 13.

The first and second outer sprocket have central openings so as to be mounted on the smaller diameter shaft of the hub. The diameter of the openings on the first and second outer sprockets is preferably larger than the hub diameter so that the outer sprockets can freely rotate and move up and down on the shaft. Clips 18, 19 are placed in openings journalled into the hub on the outer sides of the first and second outer sprockets. Belleville washers 20, 21 rest against the clips extending outwardly from the hub to the first and second outer sprockets in order to hold the first and second outer sprockets as well as the friction plates in place on the hub.

In this embodiment, as the hub rotates, and the sprockets turn relative to one another, the torsional vibrations are dampened by the springs and the friction plates as well as the Belleville washers.

Figure 7:
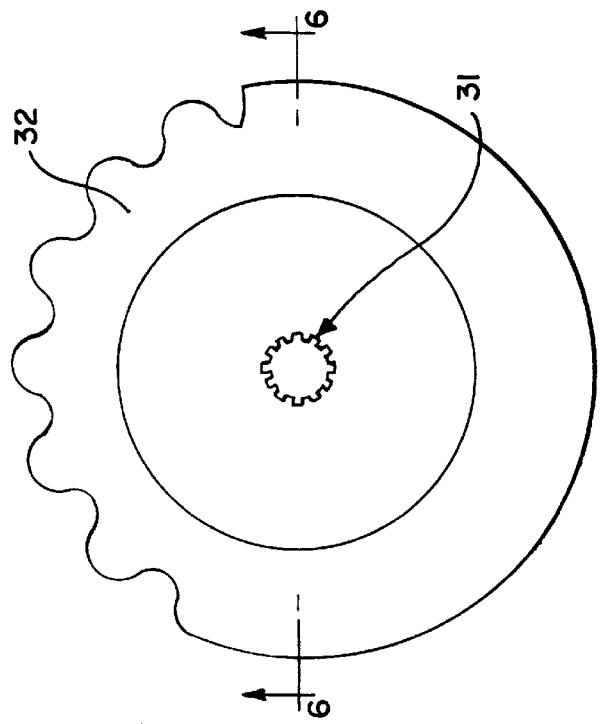
FIG. 7 is a plan view of the sprocket system illustrated in FIG. 6 with a cutaway to reveal the interior of the sprocket as illustrated in FIG. 6.
Figure 6:
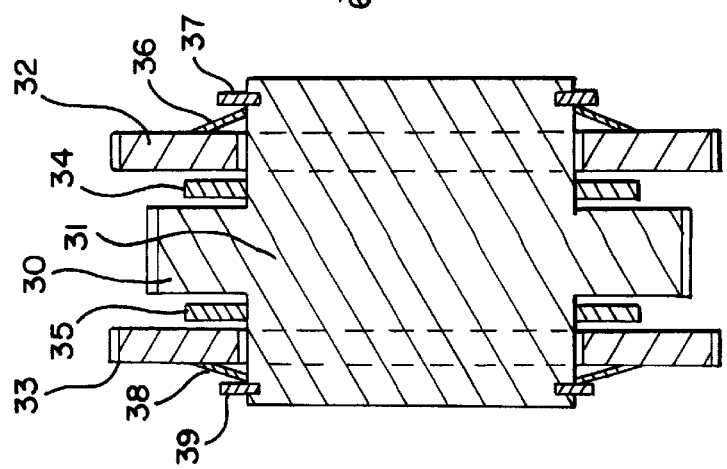
FIG. 6 is a side sectional view showing the third embodiment of the sprocket system having an internal torsional damper taken along irregular line 6—6 of FIG. 7.

In a third embodiment, as shown in FIGS. 6 and 7, the sprocket system with internal torsional damper is formed by three sprockets. Each of the three sprockets may be a conventional involute tooth sprocket. The size and dimensions of each such sprocket are dependent upon the exact system that the sprockets are used in and would be well within the skill of one of ordinary skill in the art. A hub sprocket 30 is formed integrally with the hub 31 of the crankshaft. A first outer sprocket 32, having a large central opening is placed on the shaft on one side of the hub sprocket. A second outer sprocket 33 having a large central opening is positioned on the shaft on the other side of the hub sprocket.

Friction plates 34, 35 are placed between the hub sprocket and the outer sprockets, respectively. The friction plates can be made of any suitable organic material. In this embodiment, the friction plates alternate between free sprocket plates and the hub. Belleville washers 36 are located between the first outer sprocket and a clip 37 attached to the hub. Similarly, Belleville washers 38 are placed between the second outer sprocket and the clip 39 on the hub. The Belleville washers compress the clutch packs and dissipate further torsional vibrations. The clips are placed upon the hub to hold the Belleville washers in place against the first and second outer sprockets. A large locking nut can also be included on the hub if threads are placed on the hub. By tightening the locking nut, the sprockets can be brought closer together.

In operation of this third embodiment, the friction plates as well as the Belleville washers absorb the torsional vibrations of the crankshaft and prevent their transfer to other parts of the engine system.

Figure 8:
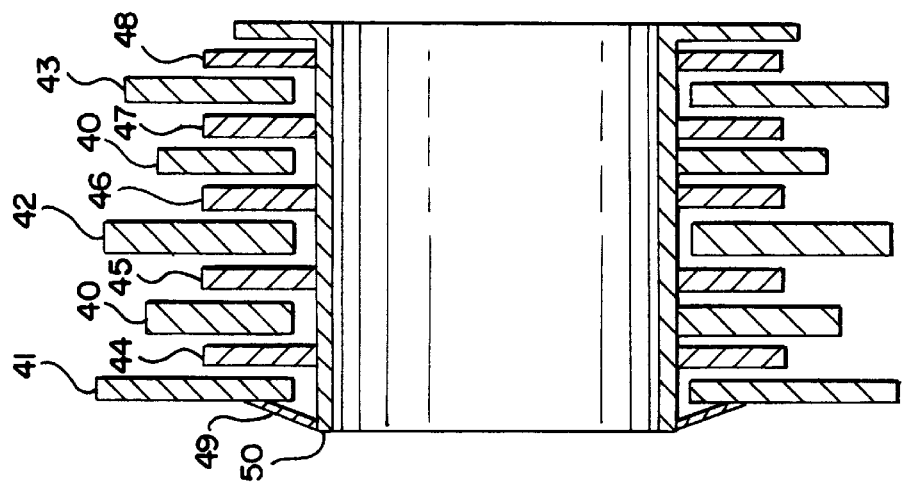
FIG. 8 is a side sectional view showing the fourth embodiment of the sprocket system having an internal torsional damper taken along irregular line 6—6 of FIG. 7.

In yet another embodiment as illustrated in FIG. 8, the hub can also be splined. Further, the hub sprockets 40 can be placed alternatively between sprockets 41, 42, 43 with friction lining (44, 45, 46, 47, 48) therebetween. Belleville washers 49 are located between the outermost sprockets and clips 50 on the hub. The clips are placed on the hub to hold the Belleville washers in place against the sprockets.

In operation of this fourth embodiment, the increase in the number of friction plates helps absorb additional torsional vibrations of the crankshaft and prevent the transfer to other parts of the engine system.

Although specific embodiments and examples have been disclosed herein, it should be borne in mind that these have been provided by way of explanation and illustration and the present invention is not limited thereby. Certainly modifications which are within the ordinary skill in the art are considered to lie within the scope of this invention as defined by the following claims.

What is claimed is:

1. A sprocket system for an engine timing drive comprising:
    a crankshaft having a crankshaft drive sprocket;
    said crankshaft drive sprocket comprising a sprocket rim and a central annular portion, said sprocket rim having teeth for engaging a chain,
    a hub member positioned upon and fastened to the crankshaft adjacent to said crankshaft drive sprocket;
    said hub member having three hub locators extending radially outwardly from the periphery of said hub and evenly spaced circumferentially around said hub member;
    said crankshaft drive sprocket having three rotational stops evenly spaced circumferentially around said sprocket rim and extending inwardly from said sprocket rim;
    friction plates attached to the hub adjacent to said hub member positioned to contact said hub member radially inwardly of said hub locators in order to provide friction therebetween,
    wherein each said hub locator is located between two of said rotational stops.

2. A sprocket system as claimed in claim 1, wherein springs are located between each hub locator and the adjacent rotational stop, rotation of the hub member and crankshaft drive sprocket relative to one another causing torsional vibrations to be dissipated.

3. A sprocket system as claimed in claim 1, wherein a housing covers said hub and sprocket.

4. A sprocket system for an engine timing drive comprising:
    a crankshaft having an integral hub sprocket having a first side and a second side;
    a first outer sprocket having an inner face and positioned on the shaft adjacent said first side of said hub sprocket;
    a second outer sprocket having an inner face, positioned on said shaft adjacent said second side of said hub sprocket,
    a first friction plate positioned between said inner face of said first outer sprocket and said first side of said hub sprocket;
    a second friction plate positioned between said inner face of said second outer sprocket and said second side of said hub sprocket;
    wherein a first spring is located between said first friction plate and said first outer sprocket, and a second spring is located between said second friction plate and said second sprocket.

5. A sprocket system according to claim 4, wherein said first outer sprocket and said second outer sprocket are held in place by clips journalled into the shaft.

6. A sprocket system according to claim 5, wherein Belleville washers are located between said clips and said first and second outer sprockets.

7. A sprocket system for an engine timing drive comprising:
    a crankshaft having an integral hub sprocket having a first side and a second side;
    a first outer sprocket having an inner face and positioned on the shaft adjacent said first side of said hub sprocket;
    a second outer sprocket having an inner face, positioned on said shaft adjacent said second side of said hub sprocket, said first outer sprocket and said second outer sprocket freely rotatable relative to said integral hub sprocket;
    a first friction plate positioned between said inner face of said first outer sprocket and said first side of said hub sprocket;
    a second friction plate positioned between said inner face of said second outer sprocket and said second side of said hub sprocket.

8. A sprocket system for an engine timing drive as claimed in claim 7, wherein said friction plates alternate between free and splined.

9. A sprocket system for an engine timing drive as claimed in claim 7, wherein said first outer sprocket is fastened to said shaft by splines.

10. A sprocket system for an engine timing drive as claimed in claim 7, wherein said second outer sprocket is fastened to said shaft by splines.

11. A sprocket system for an engine timing drive as claimed in claim 7, wherein said first and second sprockets are held in place by Belleville washers supported by clips on said shaft.

12. A sprocket system for an engine timing drive as claimed in claim 7, wherein a locking nut is located on said shaft to bring the first and second outer sprockets and hub sprocket in closer proximity to each other.

13. A sprocket system for an engine timing drive comprising:
    a crankshaft;
    a first hub sprocket and a second hub sprocket;
    a first sprocket placed between said first hub sprocket and said second hub sprocket;

a second sprocket placed on a side of said first hub sprocket, opposite said first sprocket;

a third sprocket placed on the side of said second hub sprocket opposite from said first sprocket, said first, second and third sprockets being freely rotatable relative to said first and said second hub sprockets;

a first friction plate positioned between said first sprocket and said first hub sprocket;

a second friction plate positioned between said first sprocket and said second hub sprocket;

a third friction plate positioned between said second sprocket and said first hub sprocket;

and a fourth friction plate positioned between said third sprocket and said second hub sprocket.

\* \* \* \* \*